United States Patent
Schulz et al.

(10) Patent No.: US 10,943,219 B2
(45) Date of Patent: Mar. 9, 2021

(54) SYSTEMS AND METHODS FOR TRANSPORTATION CHECK-IN AND PAYMENT USING BEACONS

(71) Applicant: PAYPAL, INC., San Jose, CA (US)

(72) Inventors: Egan Schulz, San Jose, CA (US); Michelle Pujals, San Jose, CA (US); Libo Su, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 316 days.

(21) Appl. No.: 15/714,413

(22) Filed: Sep. 25, 2017

(65) Prior Publication Data

US 2018/0293564 A1 Oct. 11, 2018

Related U.S. Application Data

(63) Continuation of application No. 14/138,676, filed on Dec. 23, 2013, now abandoned.

(51) Int. Cl.

| | |
|---|---|
| *G07B 15/02* | (2011.01) |
| *G06Q 20/14* | (2012.01) |
| *G06Q 50/30* | (2012.01) |
| *G06Q 20/32* | (2012.01) |
| *G07B 15/04* | (2006.01) |

(52) U.S. Cl.
CPC ....... *G06Q 20/145* (2013.01); *G06Q 20/3224* (2013.01); *G06Q 50/30* (2013.01); *G07B 15/02* (2013.01); *G06Q 2240/00* (2013.01); *G07B 15/04* (2013.01)

(58) Field of Classification Search
CPC ............ G07B 15/00–04; G06Q 50/30; G06Q 2240/00
See application file for complete search history.

(56) References Cited

U.S. PATENT DOCUMENTS

| | | | |
|---|---|---|---|
| 3,609,300 A * | 9/1971 | Halpern | G07B 15/02 235/384 |
| 6,085,976 A | 7/2000 | Sehr | |
| 2002/0029165 A1 | 3/2002 | Takatori et al. | |

(Continued)

OTHER PUBLICATIONS

Caltrain.com, Ticket Types, Aug. 23, 2011.*

(Continued)

*Primary Examiner* — Daniel Vetter
(74) *Attorney, Agent, or Firm* — Haynes and Boone, LLP

(57) ABSTRACT

There are provided systems and methods for transportation check-in and payment using beacons. A service provider, such as a transportation, payment, or other service provider, may utilize short range wireless beacons at or near a transportation service that provide automated check-in with a user device. When the user device is in proximity to the beacon, the user may be checked-in and provide payments for use of the transportation service, such as payment for a transportation fare. The user may receive scheduling and/or updates for the transportation service. Additionally, while the user is travelling with the transportation service, the user may purchase extra fare if the user realizes that current travel coverage of the purchased transportation fare does not cover an expected cost of the trip. The extra fare may be automatically purchased if the user device loses power or the user is unaware of the trip cost.

20 Claims, 5 Drawing Sheets

(56) References Cited

U.S. PATENT DOCUMENTS

| | | |
|---|---|---|
| 2002/0072963 A1 | 6/2002 | Jonge |
| 2003/0164399 A1 | 9/2003 | Harris |
| 2007/0205275 A1 | 9/2007 | Nicola et al. |
| 2007/0255652 A1 | 11/2007 | Tumminaro et al. |
| 2008/0116264 A1 | 5/2008 | Hammad |
| 2008/0201212 A1* | 8/2008 | Hammad ............ G06Q 20/045 705/13 |
| 2010/0078475 A1 | 4/2010 | Lin et al. |
| 2010/0265034 A1 | 10/2010 | Cap et al. |
| 2011/0153495 A1 | 6/2011 | Dixon et al. |
| 2011/0208645 A1 | 8/2011 | Knauft et al. |
| 2013/0030883 A1 | 1/2013 | Silbernagl |
| 2013/0030964 A1* | 1/2013 | Nuzzi .................... G06Q 30/04 705/30 |
| 2014/0019216 A1 | 1/2014 | Jo |
| 2014/0379391 A1* | 12/2014 | Lulic ..................... G06Q 20/40 705/5 |

OTHER PUBLICATIONS

CT transit, Express Service Fares, accessed Jul. 23, 2020.*
goMetro.com, Fare Info, accessed Jul. 23, 2020.*
Smart Card Alliance, Transit and Retail Payment: Opportunities for Collaboration and Convergence, Oct. 2003.*
Georgia Tech Research Institute, Spectrum Requirements for Dedicated Short Range Communications (DSRC), Public Safety and Commercial Applications, Jul. 1996.*

\* cited by examiner

SYSTEMS AND METHODS FOR TRANSPORTATION CHECK-IN AND PAYMENT USING BEACONS

CROSS-REFERENCED TO RELATED APPLICATIONS

This continuation patent application claims priority to and the benefit of U.S. patent application Ser. No. 14/138,676, filed Dec. 23, 2013, the contents of which are incorporated by reference in its entirety.

TECHNICAL FIELD

The present application generally relates to transportation check-in and payment using beacons and more specifically to providing short range wireless beacons in transportation hubs and transportation services to provide check-in and payment for transportation fare through a user device.

BACKGROUND

Users may utilize service providers, such as mass transportation providers including trains, subways, and buses, to commute between areas. Service providers may offer single payment use of their services, such as a token to board the transportation service. Other service providers may limit the user to a specific time and/or distance for travel based on the user's payment. Thus, if the user wishes to travel farther and/or for longer on the service provider, the user must purchase additional fare. In either scenario the user must retain enough money on their person to provide payment for the services. If the user finds that they lack the requisite money, the user may be refused service. Some service providers may fine the user if the user accidentally exceeds their specified time and/or distance limit to their paid fare. Thus, users must predict an estimated amount of fare they will be required for pay and additionally account for incidentals and/or emergencies that may exceed that estimated amount.

Figure 1:
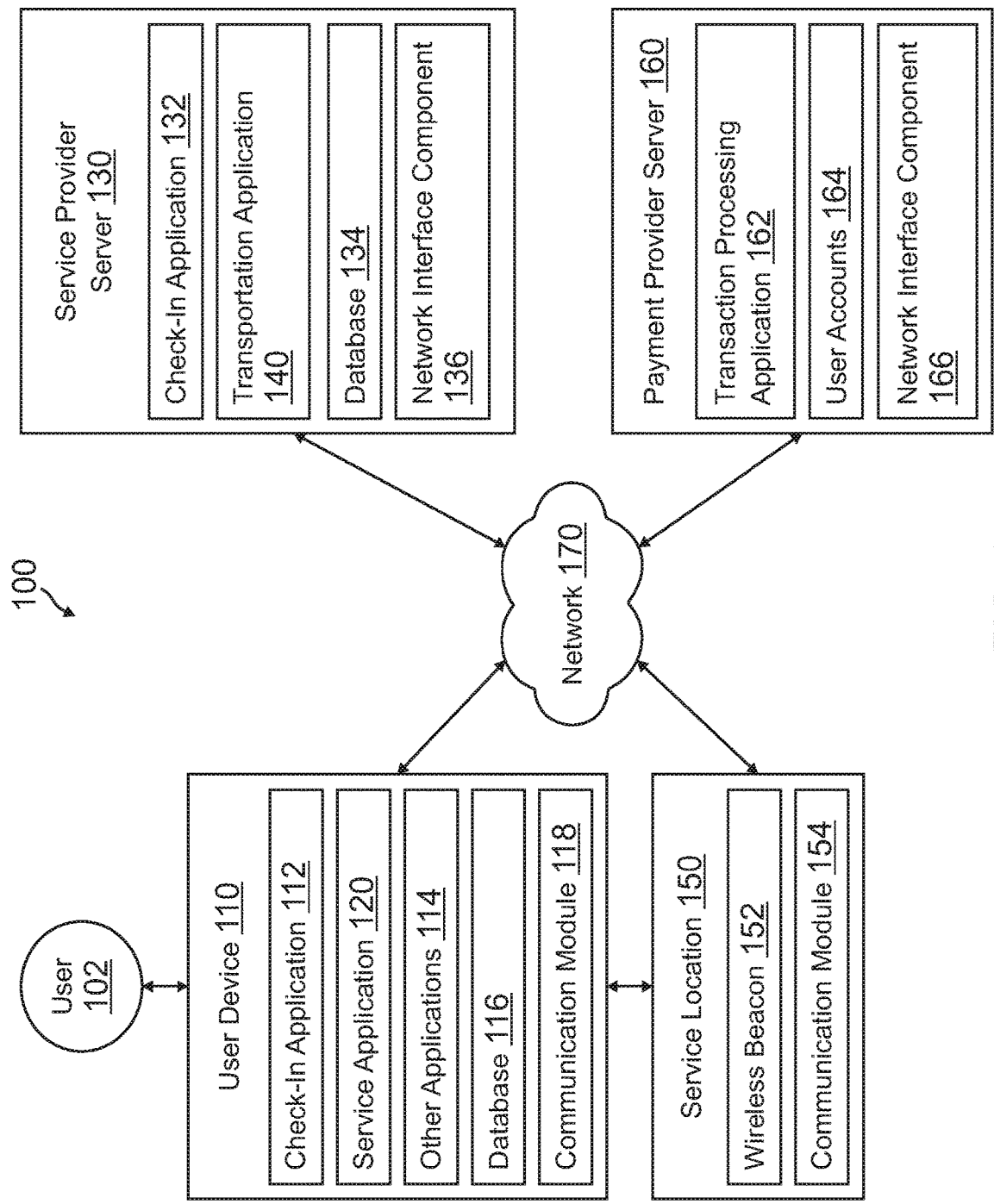
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various locations provide short range wireless communications with a user device, such as through Bluetooth Low Energy (BLE) beacon communications. These beacons may be set up at a location and communicate with the user device to alert users of check-in services through their user device. The beacons may provide additional functionality, such establishing a connection with a server entity to complete transactions, including check-in services. The beacons may provide communication services to the user device directly, including information stored on the beacons. The beacons may also provide communication with a device attached to the beacon and/or server communicating with the beacon.

A service provider, such as a transportation or payment provider, may offer check-in services to users, such as travelers, to facilitate payment for transportation services. The service provider may utilize short range wireless beacons to communicate with mobile user devices of the users. The short range wireless beacons may employ BLE communications that emit a signal receivable by a user device. The communication may include an identifier for the beacon. A user device may passively monitor for BLE communications. When a user device detects the signal and verifies the identifier as belonging to the service provider, both the user device and the beacon may ramp up in power and establish a connection, where the connection may further enable the user device to communicate with a service provider server and/or payment provider server. The beacon may be connected to a networked device at the transportation location, or the beacon may include network functionality to communicate with the servers. Thus, the beacon enables the user to complete payment for transportation services through the user device.

As the user arrives at a location corresponding to the service provider, such as a train, subway, and/or bus station, wireless beacons may establish a communication channel with a user device that the user possesses. Establishment of a communication channel may trigger a request on the user device to pay for a transportation fare with the service provider. The transportation fare may correspond to a flat fare, a time-based fare, a zone-based fare, or a distance-based fare.

The server(s) may complete the payment request for the transportation fare, and may provide a transaction history to the service provider and/or the user to verify payment of the transportation fare. The transaction history may be transmitted to the user device, the service provider, and/or a payment device corresponding to the service provider in order to authorize the user for use of the service provider. Where the user device receives the transaction history, the transaction history may include a bar code or a QR code to provide proof of payment to the service provider. In other embodiments where a payment device receives the transaction history, the payment device may provide a token, receipt, or ticket to the user to provide proof of payment. The payment device may dispense the proof of payment on entry of a code in the transaction history, or may include another beacon, which may be configured to communicate with the user device and verify the identity of the user when the user arrives at the payment device.

In various embodiments, the beacon may be located at or near a turnstile corresponding to the service provider. For example, at a subway station, a turnstile may admit passengers to the subway or to a platform to access the subway. Thus, when a user is near or at the turnstile, a payment may be effectuated to the service provider for the fare it costs to be admitted through the turnstile. In other embodiments, the beacon may be located on the service provider itself, such as the subway, train, bus, etc. Thus, when the user enters the service provider, the user may pay for the transportation fare. As before, the user may receive the transaction history. However, a transportation authority, such as a conductor or other payment oversight authority, may also receive the transaction history and verify the user's identity though a driver license or other identity card, or may receive a picture and/or name of the user from a user account with the payment provider and/or service provider server(s).

While travelling, the user may be required to purchase additional fare, or "re-up" a transportation fare to cover the cost of transportation where the original fare payment was insufficient. Thus, the service and/or payment provider server(s) may process a second payment request for additional transportation fare, and may complete the request and transmit a transaction history for proof of payment. The user may transmit the second payment request if the user wishes to purchase additional fare. A notification on the user device may alert the user that the purchased transportation fare is insufficient. However, in various embodiments, the user device, service provider server, and/or payment provider server may be configured to determine if additional fare is required based on the purchased transportation fare, and process the second payment request without user input, such as if the user device runs out of power, does not have a signal, or the user is unaware of the lack of fare.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a service provider server 130, a service provider 150, and payment provider server 160 in communication over a network 170. User 102, such as a traveler, may utilize user device 110 to check-in to service provider server 130 through wireless beacon 152 at service provider 150 and/or over network 170. Service provider 150 may correspond to a transportation service (e.g., a train, subway, bus, etc.) and/or a location corresponding to the transportation service (e.g., a station, port, etc.). Once checked-in to service provider server 130, user 102 may utilize user device 110 to receive scheduling, timing, and other transportation information. Additionally, user 102 may effectuate payments to service provider server 130 for transportation fare with service provider 140 using payment provider server 160. Wireless beacon 132 and/or other devices at service provider 150 may assist user 102 in utilizing service provider 150, such as providing proof of payment and/or admitting user 102 to service provider 150.

User device 110, service provider server 130, service provider 150, and payment provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software configured for wired and/or wireless communication with service provider server 130, wireless beacon 152 of service provider 150, and/or payment provider server 160. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized.

User device 110 of FIG. 1 contains a check-in application 112, a payment application 120, other applications 114, a database 116, and a communication module 118. Check-in application 112, payment application 120, and other applications 114 may correspond to processes, procedures, and/or applications executable by a hardware processor, for example, a software program. In other embodiments, user device 110 may include additional or different software as required.

Check-in application 112 may be used by user 102 of user device 110 to establish a connection between user device 110 and service provider server 130. Check-in application 112 may correspond to a specific application utilized by user device 110 with service provider server 130 to complete a check-in with service provider server 130. The check-in with service provider server 130 may correspond to a process to log in to a user account of user 102 with service provider server 130. In other embodiments, the check-in may provide and/or verify identity of user 102, including transmission of an identifier for user 102 and/or user device 110. The check-in may be completed over network 170 with service provider server 130. In such embodiments, check-in application 112 may correspond more generally to a browser application configured to communicate with service provider server 130.

Check-in application 112 may also correspond to an application available over the Internet for download from service provider server 130 and/or payment provider server 160. Check-in application 112 may receive short range wireless communications with wireless beacon 152 at service provider 150 to complete a check-in process. For example, service provider 150 may include infrastructure with wireless beacon 152 to communicate with user device 110 and complete the check-in process with service provider server 130.

Check-in application 112 may execute in the background of an operating system of user device 110 and be configured to establish connections, using communication module 118 of user device 110, with wireless beacon 152 at service provider 130. The connection may be established with or without user input from user 102. For example, wireless beacon 152 may broadcast a token, such as a universally unique identifier (UUID), for reception by check-in application 112, as will be explained in more detail herein. Check-in application 112 may utilize communication module 118 of user device 110 to receive the token from wireless beacon 152. If check-in application 112 acknowledges the UUID as identifying service provider server 130, service provider 150, and/or wireless beacon 152, check-in application 112 may transmit an identifier corresponding to user 102 and/or user device 110 back to wireless beacon 152. Check-in application 112 may utilize communication module 118 of user device 110 to communicate with wireless beacon 152 (e.g., over near field communication, Bluetooth, Bluetooth Low Energy, radio, infrared, or other connection). The identifier from user device 110 may include, be transmitted with, concatenated with, or otherwise bundled with the identifier received from wireless beacon 152.

Once a connection is established with wireless beacon 152, user device 110 may be checked-in with service provider server 130 if user 102 has not previously been checked-in. The check-in process may then associate user 102 with wireless beacon 132 used to check-in user 102. Where wireless beacon 152 corresponds generally to service provider 130 (e.g., a train station), user 102 may be associated with service provider 130. However, in other embodiments, wireless beacon 152 may correspond to a transportation vehicle running along a determined route. Thus, user 102 may be associated with the transportation vehicle and/or route.

Check-in application 112 may receive information from service provider server 130. Check-in application 112 may receive transportation information, transportation fare pricing and information, maps, processes to request/purchase transportation fare, etc. For example, check-in application 112 may receive at least one of transportation vehicle scheduling, passenger congestion rates at or on specific cars or areas of the transportation vehicle, weather at stops of the transportation vehicle, and timing updates of the transportation vehicle. The information may be passed to check-in application 112 generally based on service location 130. Additionally, the service provider 130 may correspond to a specific transportation vehicle, where information passed to check-in application 112 may be specific to the vehicle. Moreover, user 102 may be required to purchase additional fare so that processes to purchase transportation fare may be specific to user 102, as will be explained in more detail herein. Since user 102 is already checked-in with service provider server 140, service provider server 140 may know an identifier of user device 110 and transmit the information to user device 110 using that identifier over network 170 and/or through one of wireless beacon 132

Check-in application 112 may utilize communication module 118 to pass information to service provider server 130, service provider 150, and/or payment provider server 160. Information passed to service provider server 130, service provider 150, and/or payment provider server 160 may include requests to purchase transportation fare, requests for transportation information, user identifiers (including payment account identifiers), and/or other user information and requests.

Payment application 120 may be used, for example, to provide a convenient interface to permit user 102 to select payment options and provide payment for items and/or services. For example, payment application 120 may be implemented as an application having a user interface enabling the user to enter payment options for storage by user device 110 and provide payment on checkout/payment of an item/service (i.e., transportation fare including the transportation service and/or a token/receipt for admission to the transportation service). In certain embodiments, payment application 120 may correspond more generally to a web browser configured to view information available over the Internet or access a website corresponding to a payment service. Payment application 120 may utilize user financial information, such as a credit card, bank account, or other financial account to complete payment for the item/service. Additionally, payment application 120 may provide payment for items using a user account with payment provider, such as payment provider server 160.

Once user 102 has checked-in with service provider server 130, user device 110 may establish a connection with service provider server 130 and/or payment provider server 160. Payment application 120 may then populate payment information for transportation fare transmitted to user device 110 from service provider server 130. For example, payment application 120 may receive a schedule and costs for transportation fare. If user 102 chooses a transportation fare, service provider server 130 may generate a payment request from the user input and an identifier of user device 110. Since user 102 is already checked-in with service provider server 130, service provider server 130 may have the identifier of user device 110 and transmit a payment request to payment provider server 160 using that identifier with the requested fare. However, in other embodiments, user device 110 may generate a payment request for payment provider server 160 from information transmitted to user device 110 (i.e., information from service provider server 130 over network 170 and/or wireless beacon 152). In such embodiments, user device 110 may transmit a UUID or another identifier of service provider server 130 to payment provider server 160 with the transportation fare information and/or an identifier of user 102 and/or user device 110. In certain embodiments, the payment request may include a request to purchase additional fare after a previous transportation fare has been purchased, such as renewing, "re-up"-ing, or reloading the previous transportation fare. Thus, the purchase request may include additional information corresponding to the previous transportation fare.

Thus, payment application 120 may utilized to complete the payment request between user device 110 and service provider server 130 by providing payment for transportation fare. Payment can be provided from payment provider server 160, for example, though a payment account of user 102 with payment provider server 160, or through user financial information stored/input to payment application 120. In various embodiments, the server completing the payment may transmit a transaction history documenting completion of the transaction. The transaction history may be transmitted to user device 110, wireless beacon 152, service provider server 130, and a payment device corresponding to the service provider 150. Thus, user 102 may utilize transportation services of service provider 150.

Payment application 120 may further include options to store transaction history for purchased items (e.g. transportation fare), such as receipts, for later use. For example, a transaction history for transportation fare may include proof of payment using a barcode or a QR code. Thus, payment application 120 provides an interface enabling user 102 to provide proof of payment for the transportation fare to a transportation authority on the service provider, such as a conductor checking purchased tickets.

In various embodiments, check-in application 112 and/or payment application 120 may be incorporated in the same application so as to provide their respective features in one convenient application interface.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with payment provider server 160. Other applications 114 may include browser and/or mapping applications where the functions are not provided by check-in application 112 and/or payment application 120. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 112, payment application 120, and/or other applications 114, identifiers associated with hardware of user device 110, or other appropriate identifiers, such as identifiers used for payment/user/device authentication or identification. Database 116 may include user device tokens and/or encryption keys, including a public key of service provider server 130 and/or service provider 150 for wireless beacon 152. Database 116 may include identifying information for tokens enabling check-in application 112 to identify service provider server 130 and/or service provider 150 when receiving a corresponding token. In one embodiment, identifiers in database 116 may be used by a payment/credit provider, such as payment provider server 160, to associate user device 110 with a particular account maintained by the payment/credit provider.

User device 110 includes at least one communication module 118 adapted to communicate with service provider server 130, service provider 150, wireless beacon 152, and/or payment provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 152 without network 170.

Service provider server 130 may be maintained, for example, by a transportation provider including a plurality of transportation services providing travel between location, where the transportation provider may correspond to physical locations for embarking and disembarking the transportation service. Generally, service provider server 130 may be maintained by anyone or any entity that provides transportation. In this regard, service provider server 130 may include one or more applications, which may be configured to interact with user device 110 and/or service provider 150 to complete check-in processes. Service provider server 130 may be further configured to create, and/or receive payment request for transportation fare with service provider 150. Additionally, service provider server 130 may facilitate the exchange of money and the transmission of transaction histories with user device 110 using payment provider server 160. Although only one service provider server is shown, a plurality of service servers may be utilized. In various embodiments, the check-in, payment, and/or transportation services of service provider server 130 may also be offered by a payment provider, such as payment provider server 160. Thus, all or part of the described features and processes of service provider server 130 may be incorporated within payment provider server 160.

Service provider server 130 includes a check-in application 132, a transportation application 140, a database 134, and a network interface component 136. Check-in application 132 and transportation application 140 may correspond to processes, procedures, and/or applications executable by a hardware processor, for example, a software program. In other embodiments, service provider server 130 may include additional or different software as required.

Check-in application 132 may correspond to processes to complete check-in with user device 110. Thus, check-in application 132 may correspond to the server side application of service provider server 130 configured to transmit and/or receive a check-in request from user device 110 and complete the check-in request. The check-in request may include log in information for a user account in database 134 and thus complete the check-in with user 102 by verifying the account information. However, in embodiments where a user account has not been previously established by user 102 and/or service provider server 130 does not offer user account services, check-in application 132 may receive other information for identifying user 102, include user name/identifier, user device identifier, an identifier for an account with another server (e.g., a payment account/payment account identifier with payment provider server 160), or other information.

Once check-in is completed between user device 110 and service provider server 130, check-in application 132 may be utilized to transmit and receive information corresponding to service provider 150. Additionally, user 102 may be checked-in to each transportation service at service provider 150 due to the initial check-in with service provider server 130. However, in other embodiments, user 102 may only be checked-in to a transportation service when user 102 is in proximity to a wireless beacon corresponding to the transportation service (e.g., on a transportation vehicle).

Service provider server 130 further includes transportation application 140. Transportation application 140 may be utilized to provide transportation service information including transportation fares to user device 110. For example, transportation application 140 may provide at least one of transportation vehicle scheduling, passenger congestion rates at or on specific cars or areas of the transportation vehicle, weather at stops of the transportation vehicle, and timing updates of the transportation vehicle to user device 110. Additionally, transportation application 140 may also provide information about a flat fare, a time-based fare, a zone-based fare, and a distance-based fare of service provider 150.

In various embodiments, transportation application 140 may be utilized to complete a transaction on behalf of service provider 150 with user device 110. When user 102 wishes to purchase transportation fare for service provider 150, user 102 may utilize user device 110 to authorize transmitting a payment to service provider server 130. User 102 and service provider server 130 may further utilize payment provider server 160 to complete the transaction. In certain embodiments, user 102 may wish or be required to purchase additional transportation fare where a previously purchased transportation fare does not cover a cost of user of service provider 150. Transportation application 140 may alert user 102 through user device 110 that the previously purchased transportation fare does not cover the cost of use of service provider 150. Thus, user 102 may authorize a second payment to service provider server 130, which may use payment provider server 160 to process the payment. The second payment authorization may be generated and/or processed without user input, for example, if user 102 forgets to purchase additional fare or if user device 110 runs out of power or does not receive a signal to authorize the second payment.

In certain embodiments, service provider server 130 may further provide and/or complete a transaction history to one or more entity to provide proof of payment for a transportation fare and enable user 102 to utilize service provider 150. Transportation application 140 may receive payment from payment provider server 160 for a transportation fare and provide a transaction history to an entity to provide proof of payment for the transportation fare. In other embodiments, payment provider server 160 may provide the transaction history documenting payment of the transportation fare to service provider server 130. Thus, transportation application 140 may add proof of payment (e.g., a QR or bar code) to the transaction history and transmit the transaction history to user 102.

A transaction history may be transmitted to user device 110, wireless beacon 152, and/or a payment device corresponding to service provider 150. The payment device may correspond to a device to receive payment and issue a token, receipt, or other symbolic representation of payment to user 102. The representation may enable user 102 to access, board, etc., service provider 150. In other embodiments, wireless beacon 152 may correspond to a turnstile, where the transaction history enables user 102 to pass through the turnstile. The transaction history may also be sent to a transportation authority that may view the transaction history and allow user 102 to utilize service provider 150. In such embodiments, the transaction history may include identification information of user 102, such as a name, image, and/or identifier for user 102.

Service provider server 130 further includes database 134 which may include, for example, identifiers such as operating system registry entries, cookies associated with check-in application 132 and/or transportation application 140, identifiers associated with hardware of service provider server 130, or other appropriate identifiers, such as identifiers used for payment/user/device authentication or identification. Database 134 may include user accounts of user 102, which may comprise user personal information, user financial information, an identifier for user 102, and/or an identifier for user device 110. In various embodiments, identifiers in database 134 may be used by a payment/credit provider, such as payment provider server 160, to associate user 102 with a particular account maintained by the payment/credit provider. For example, an identifier for a payment account with payment provider server 160 may be stored with a user account or identifier of user 102 in database 134. In other embodiments, a user account stored in database 134 may include a shared identifier with the payment account with payment provider server 160.

Service provider server 130 includes at least one network interface component 136 adapted to communicate with user device 110, service provider 150, and/or payment provider server 160 over network 170. In various embodiments, network interface component 136 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider 150 may correspond to a physical location where a transportation provider provides transportation services between locations. The transportation provider may correspond to a bus, a subway, or a train. The transportation provider may provide transportation fares for the transportation services, including a flat fare, a time-based fare, a zone-based fare, or a distance-based fare. Service provider 150 may be one of a plurality of service providers corresponding to service provider server 130. However, in other embodiments, service provider server 130 may correspond only to service provider 150.

Service provider 150 includes a wireless beacon 152 and a communication module 154. In other embodiments, service provider 150 may include additional or different software and devices as required Wireless beacon 152 may be maintained, for example, by service provider server 130 and transportation service 130. Wireless beacon 152 may be implemented using any appropriate hardware and software configured for wireless communication with user device 110. For example, in one embodiment, wireless beacon 152 may be implemented as a dongle device including a hardware processor and a communication module, for example, connected to device at service provider 150. Wireless beacon 152 may also be implemented as a device incorporated within a personal computer (PC), a smart phone, personal digital assistant (PDA), laptop computer, and/or other types of computing devices capable of transmitting and/or receiving data, such as an IPAD® from APPLE®. Wireless beacon 132 may also act as a stand-alone device including a processor, communication module, and/or network interface component configured to communicate with user device 110 and/or service provider server 140. Although a single beacon is described, a plurality of wireless beacons may be utilized and be location specific within service provider 150, as previous discussed.

Wireless beacon 152 of FIG. 1 contains processes, procedures, and/or applications executable by a hardware processor, for example, a software program, configured to interact with user device 110. Wireless beacon 152 may include applications for transmitting requests to establish a connection between a user device and wireless beacon 152. Thus, wireless beacon 152 may utilize a low energy short range wireless communication of wireless beacon 152 to transmit requests to establish a connection with user device 110, including an identifier such as a Universally Unique Identifier (UUID). If user device 110 receives a request to establish the connection with wireless beacon 152 and responds with a user device identifier (potentially including the UUID and other information to effectuate a check-in of user device 110), wireless beacon 152 may ramp up in power and create a connection between user device 110 and wireless beacon 152.

Wireless beacon 152 may transmit the request to establish the connection with wireless beacon 152 as a short range communication (e.g. a BLE protocol communication) including a "wake up" process for check-in application 112 of user device 110 and/or a token for wireless beacon 152. In other embodiments, the request and/or connection may utilize near field communication, radio communication, infrared communication, or Bluetooth communication. The request may be specific to user device 110 by including information that is specific to user 102, such as a name, identifier, or user device identifier. The information specific to user 102 may be determined from a user account of user 102 or other information previously provided to service provider server 130. Thus, in certain embodiments, only user device 110 will pick up and authenticate the request.

After wireless beacon 152 receives a user device identifier from user device 110, wireless beacon 152 may determine user 102 is at in proximity to service provider 150. Wireless beacon 152 may pass the user device identifier to service provider server 130 to complete the check-in process. As shown in FIG. 1, wireless beacon 152 utilizes communication module 154 to pass the information to service provider server 130. However, in other embodiments, wireless beacon 152 may utilize a network connection of wireless beacon 152 using a communication module of wireless beacon 152. Additionally, wireless beacon 152 may keep a communication channel open between user device 110, service provider server 130, and/or payment provider server 160 for passing additional information, such as transaction, payment, transportation, and/or identification information.

In various embodiments, service provider 150 includes at least one communication module 154 adapted to communicate with user device 110, service provider server 130, and/or payment provider server 160 over network 170. Communication module 154 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 160 may be maintained, for example, by an online payment service provider, which may provide payment services and/or processing for financial transactions on behalf of a user. In this regard, payment provider server 160 includes one or more processing applications which may be configured to interact with user device 110, service provider server 130, and/or service provider 150 to facilitate payment for a transaction. In one example, payment provider server 160 may be provided by PAYPAL®, Inc. of San Jose, Calif., USA. However, in other embodiments, payment provider server 160 may be maintained by or include a credit provider, financial services provider, financial data provider, and/or other service provider, which may provide payment services to user 102.

Payment provider server 160 of FIG. 1 includes a transaction processing application 162, user accounts 164, and a network interface component 166. Transaction processing application 162 may correspond to processes, procedures, and/or applications executable by a hardware processor, for example, a software program. In other embodiments, payment provider server 160 may include additional or different software as required.

Transaction processing application 162 may be configured to receive and/or transmit information from user device 110, service provider server 130, and/or service provider 150 for processing and completion of financial transactions. Transaction processing application 162 may include one or more applications to process financial transaction information from user device 110, service provider server 130, and/or service provider 150 by receiving a request to complete transaction for transportation fares for service provider 150. The request may correspond to a payment from user device 110 to service provider server 130. The payment may include a user account identifier or other payment information (e.g. a credit/debit card or checking account). Additionally, the payment may include a payment amount and terms of payment. Transaction processing application 162 may complete the transaction by providing payment to service provider server 130. Additionally, transaction processing application 162 may provide transaction histories, including receipts, to user device 110, service provider server 130, service provider 150, and/or another entity/device of service provider server 130 for completion and documentation of the financial transaction. For example, a transaction history may be provided to user device 110 and/or service provider server 130 in order to admit user 102 to service provider 150. In other embodiments, service provider 150 (e.g., a device and/or transportation authority) may receive the transaction history entitling user 102 to utilized service provider 150. Service provider 150 may also have one or more payment devices at or near service provider 150, which may provide a token, receipt, or other representation to enable user 102 to utilize service provider 150. The payment devices may include a beacon at or near the device configured to detect user device 110 and dispense the token/receipt on detection of user device 110. The beacon at the payment device may function similar to wireless beacon 152.

Additionally, payment provider server 160 may include user accounts 164. As previously discussed, user 102 may establish one or more user accounts with payment provider server 160. User accounts 164 may include user information, such as name, address, birthdate, payment/funding information, additional user financial information, and/or other desired user data. User 102 may link user accounts 164 to user device 110 through a user device identifier. Thus, when a device identifier corresponding to user device 110 is transmitted to payment provider server 160 (e.g. from user device 110 and/or service provider server 130), a user account belonging to user 102 may be found. However, in other embodiments, user 102 may not have previously established a user account. Thus, payment provider server 160 may complete a transaction based on another user financial account received from user device 110 and/or service provider server 130.

In various embodiments, payment provider server 160 includes at least one network interface component 166 adapted to communicate user device 110, service provider server 130, and/or service provider 150 over network 170. In various embodiments, network interface component 143 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
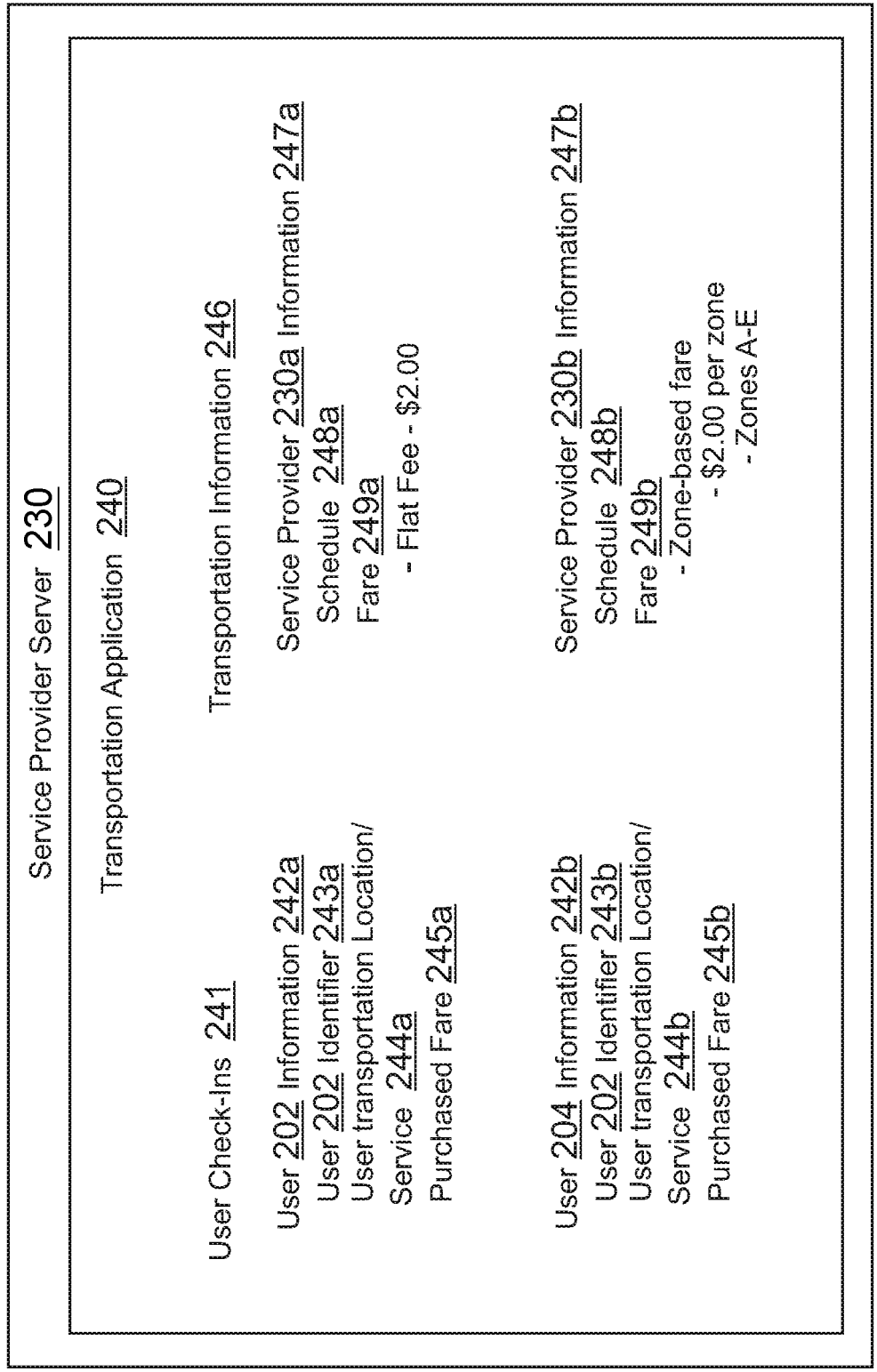
FIG. 2 is an exemplary server including check-in information and transportation information, according to an embodiment.

FIG. 2 is an exemplary server including check-in information and transportation information, according to an embodiment. FIG. 2 includes service provider server 230 and transportation application 240 corresponding generally to service provider server 130 and transportation application 140, respectively, of FIG. 1.

According to FIG. 2, service provider server 230 executes transportation application 240 to receive user identifiers from a user 202 and a user 204 and complete purchase requests for transportation fares. Thus, transportation application 240 includes user check-ins 241 and transportation information 246. User check-ins 241 may correspond generally to completed check-ins by a user using a user device with service provider. For example, a user may utilize a network connection to access service provider server 230 over the Internet and complete a check-in with provider server 230. In other embodiments, the user may connect to a beacon at a service provider corresponding to service provider server 230 and complete the check-in through the beacon at the service provider.

User check-ins 241 includes user 202 information 242a and user 204 information 242b corresponding generally to a user 202 and a user 204, respectively. User 202 information 242a and user 204 information 242b may include information transmitted to service provider server 230. Thus, user 202 information 242a includes user 202 identifier 234a, user transportation location/service 244a, and purchased fare 245a, while user 204 information 242b includes user 204 identifier 234b, user transportation location/service 244b, and purchased fare 245b. User 202 identifier 234a and user 204 identifier 234b may correspond generally to received identifiers from a user check-in with a wireless beacon at a service provider. Thus, user 202 identifier 234a and user 204 identifier 234b may display one or a plurality of identifiers corresponding to the user 202 and user 204, respectively, at the service location. User 202 identifier 234a and user 204 identifier 234b may correspond to an identifier for user 202/204, a user device identifier for a user device of user 202/204, a user account identifier for user 202/204 (including a payment account identifier with a payment provider server), and/or other user identifier. Transportation application 240 may receive the identifiers from a check-in with a check-in application of service provider server 230. Transportation application 240 may then utilize user 202 identifier 234a and user 204 identifier 234b for processing transportation fare payment requests and/or transmitting transportation information to user 202 and user 204, respectively.

User transportation location/service 244a and user transportation location/service 244b may correspond to a requested and/or utilized transportation service (e.g., request or use of a transportation vehicle) for user 202 and user 204, respectively. user transportation location/service 244a/244b may include rate information for the transportation service, scheduling information, or other information for the transportation service that is relevant to user 202/204. User transportation location/service 244a/244b may be utilized to process a payment for transportation fare with the transportation service and/or provide a transaction history to user 202/204. Additionally, user transportation location/service 244a and user transportation location/service 244b may be utilized to create alerts when a purchased fare 245a and a purchased fare 245b are insufficient. User 202 and user 204 may be alerted when purchased fare 245a and purchased fare 245b, respectively, are insufficient to cover a cost of using the transportation service and additional fare should be purchased. Thus, purchased fare 245a and purchased fare 245b may include information for user 202 and user 204, respectively, corresponding to a purchased cost/amount/length of transportation fare.

Transportation information 246 includes service provider 230a information 247a and service provider 230b information 247b. Service provider 230a information 247a and service provider 230b information 247b includes information for scheduling and fees to user a transportation service, such as a transportation vehicle. Thus, service provider 230a information 247a includes a schedule 248a and a fare 248a while service provider 230b information 247b includes a schedule 248b and a fare 249b. Service provider 230a information 247a and service provider 230b information 247b may be utilized to process a purchase request for transportation fare from user 202/204 and/or provide a transaction history for purchased transportation fare to user 202/204.

Schedule 248a/248b includes transportation services scheduling information, such as timing of drop-offs/pick-ups, arrival/departure timing, length of travel, distance of travel, traffic conditions, weather condition, expected delays, and similar information. Schedule 248a/248b may be utilized by user 202/204 when purchasing transportation fare by picking a desired travel schedule. Similarly fare 249a/249b includes information for user 202/204 to utilize when picking the desired travel schedule to determine costs and affordability of the travel. Fare 249a/249b may include information for the transportation provider and expected fare rates, including a flat fare, a time-based fare, a zone-based fare, and a distance-based fare.

Figure 3A:
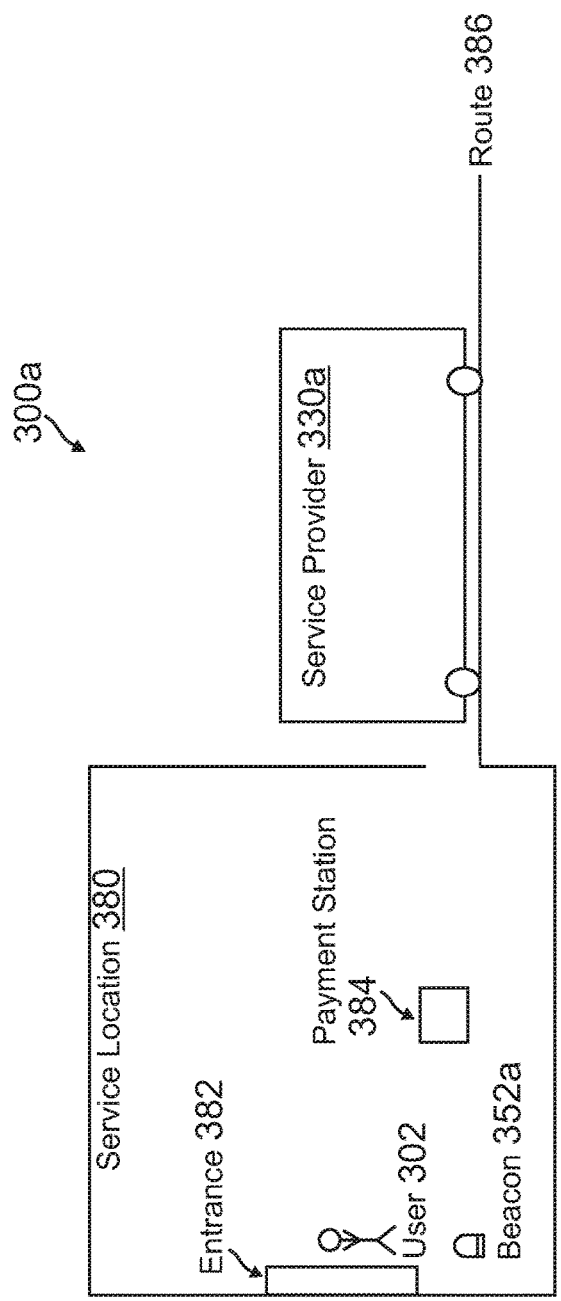
FIG. 3A is an exemplary system environment for a user engaging in travel using a service provider at a service location, according to an embodiment.

FIG. 3A is an exemplary system environment for a user engaging in travel using a service provider at a service location, according to an embodiment. FIG. 3A includes a system environment 300a having a service location 380 corresponding to service provider 330a. Service provider 330a may correspond to one or a plurality of service providers that offer transportation services to a user 302. User 302 may visit service location 380 to access service provider 330a.

At service location 380, user 302 may pass through entrance 382 with a beacon 352a nearby. Beacons 352a may check-in user 302, as previously discussed. Additionally, beacon 352 may assist user 302 in viewing transportation fare rates and/or schedules for service provider 330a. For example, a transportation fare for service provider 330a may include a flat rate to access service provider 330a on route 386 (e.g., a subway line). Route 386 may also be time, zone, and/or distance based, so that user 302 may select an amount of a transportation fare to purchase. User 302 may select between various schedules for use of service provider 330a and may be updated of traffic conditions on route 386, congestion in service provider 330a, and/or other information. Once user 302 has selected a transportation fare including scheduling for the fare, user 302 may utilize a user device with beacon 352a to transmit a payment request for the transportation fare to a service provider for service provider 330a and/or a payment provider.

Once a payment request has been processed for transportation fare with service provider 330a, user 302 may receive a transaction history enabling user 302 to access service provider 330a. In other embodiments, the transaction history may be transmitted to a turnstile at service location 380, which may admit user 302 to service provider 330a when the user is in proximity to the turnstile or presents proof of payment to the turnstile (or authority at the turnstile). For example, the turnstile may receive the transaction history and be automated to admit user 302 on presentation of a copy of the transaction history, identification, or a code (including a numerical code, bar code, and/or QR code) at the turnstile or to an authority at the turnstile. In other embodiments, user 302 may visit payment station 384, which may provide a token, receipt, or other symbolic representation that may admit user to service provider 330a when redeemed. Alternatively, service provider 330a and/or an authority on service provider 330a may receive the transaction history and admit user 302.

Figure 3B:
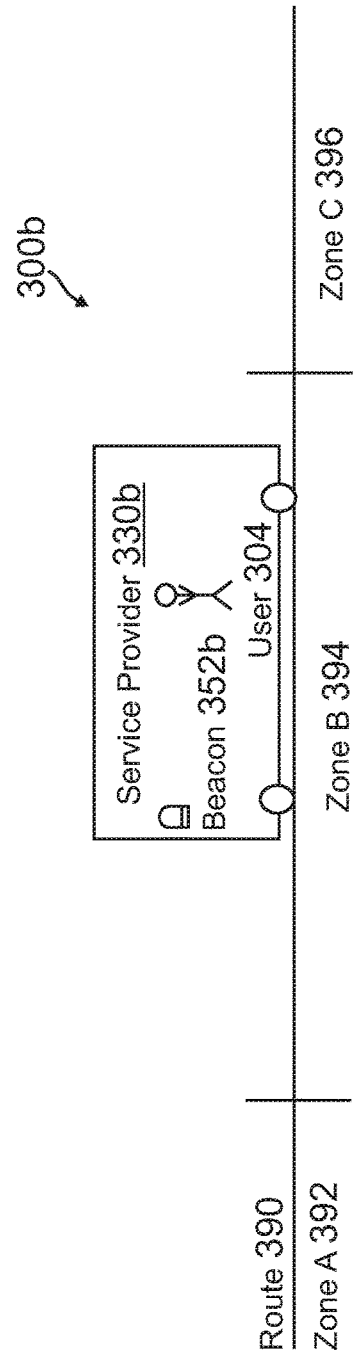
FIG. 3B is an exemplary system environment for a user travelling on a service provider, according to an embodiment.

FIG. 3B is an exemplary system environment for a user travelling on a service provider, according to an embodiment. FIG. 3A includes a system environment 300b having a service provider 330b traveling along a route 390. Service provider 330b includes a beacon 352b with a user 304 traveling on service provider 330b. User 302 may utilize beacon 352b to complete payment for transportation fare with service provider 330b.

User 304 may travel on service provider 330b along route 390. User 304 may be checked-in through beacon 352b or may previously have been checked in with another beacon corresponding to service provider 330b. User 304 may also have provided payment for an initial transportation fare to embark on service provider 330b. However, if user 304 has not previously purchased an initial transportation fare, once user 304 is on service provider 330b, user 304 may complete a check-in using beacon 352b and provide payment for the initial transportation fare.

As shown in FIG. 3B, route 390 is split into zone A 392, zone B 394, and zone C 396. User 304 may have purchased the initial transportation fare only to travel from zone A 392 to zone B 394. However, user 304 may have changed their mind, may have forgotten that they are travelling to zone C 396, or otherwise decided that they will travel to zone C 396. However, having only paid for travel from zone A 392 to zone B 394, user 304 may face a fine or may be refused service if user 304 does not purchase additional transportation fare.

Thus, user 304 may purchase additional transportation fare while utilizing service provider 330b. For example, user 304 may utilize a user device with beacon 352b to check-in and transmit a purchase request for additional fare for service provider server 330b. User 304 may be reminded to purchase additional transportation fare when nearing or at zone c 396, such as through an alert on the user device for user 304. In certain embodiments, if user 304 forgets to purchase additional transportation fare or their user device cannot purchase additional fare, but user 304 is checked-in through beacon 352b, the additional transportation fare may be automatically purchased for user 304 without user input.

Figure 4:
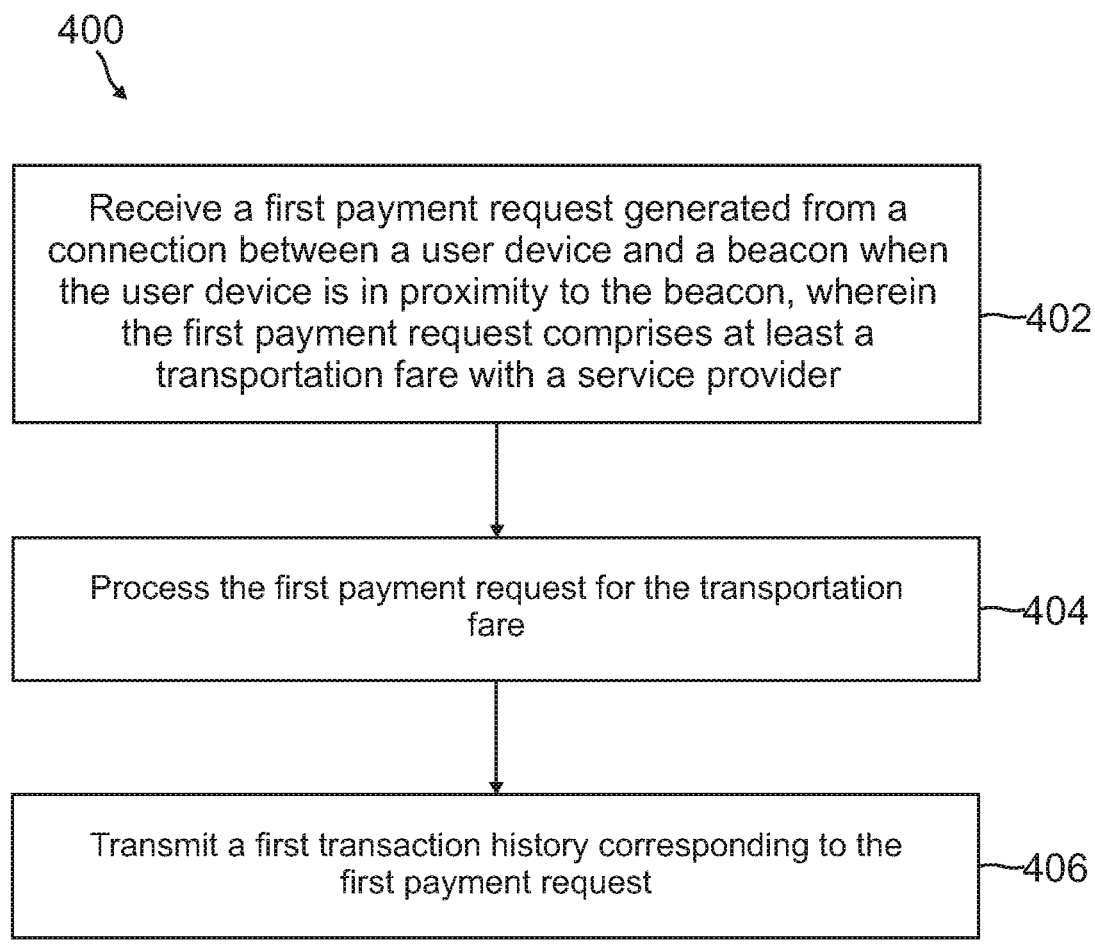
FIG. 4 is a flowchart of an exemplary process by a server for completing check-in and payment services using beacons at transportation locations, according to an embodiment.

FIG. 4 is a flowchart of an exemplary process by a server for completing check-in and payment services using beacons at transportation locations, according to an embodiment. Note that one or more steps, processes, and methods described herein may be omitted, performed in a different sequence, or combined as desired or appropriate.

At step 402, a first payment request generated from a connection between a user device and a beacon when the user device is in proximity to the beacon is received, wherein the first payment request comprises at least a transportation fare with a service provider. The connection between the user device and the beacon may use one of near field communication, radio communication, infrared communication, Bluetooth communication, and Bluetooth low energy communication. The beacon may transmit a request to establish the connection between the user device and the beacon, wherein the request comprises a first identifier. The first identifier may be a universally unique identifier, and the user device may transmit back to the beacon a user device identifier to complete the request to establish the connection.

In various embodiments, the transportation fare comprises one of a flat fare, a time-based fare, a zone-based fare, and a distance-based fare. Additionally, the service provider may be a bus, a subway, a train, or any other transportation provider requiring a fare for passage. After connection between the beacon and the user device, the transportation or service provider may provide directly, or using the beacon, at least one of transportation vehicle scheduling, passenger congestion rates at or on transportation vehicle, weather at stops of the transportation vehicle, and timing updates of the transportation vehicle to the user device. The service provider may receive preferences from the user, including a start and a stop location for travel. Thus, the service provider may minimize at least one of the transportation fare, travel time on the transportation vehicle to obtain a recommended travel route using the start and stop locations, and transmit the recommended travel route to the user device prior to the user transmitting a first payment request.

At step 404, the first payment for the transportation fare is processed. The first payment may be completed using a payment provider. Completion of the first payment may comprise transmitting monetary payment to the service provider and/or a server of the service provider to fund the transportation fare for use of the transportation services by a user.

At step 406, a first transaction history corresponding to the first payment request is transmitted. The first transaction history may be transmitted to at least one of the user device, a service provider server, and a payment device corresponding to the service provider. Where the first transaction history is transmitted to the payment device, the payment device may provide a token for admission to the service provider. If the user device receives the first transaction history, the first transaction history may comprise proof of payment using a barcode or a QR code.

In various embodiments, the beacon may be located at or near a turnstile at a location corresponding to the service provider. Thus, the turnstile may admit a user to the service provider based on the transaction history. In other embodiments, the beacon is located on the transportation vehicle, where a transportation authority, such as a conductor, receives the transaction history or the user provides proof of payment to the transportation authority using the user device.

The user may also be alerted that the transportation fare does not cover a cost of use of the transportation services. Thus, a second payment request for an additional transportation fare with service provider may be processed while the user is on the transportation vehicle. The second payment request may be completed and a second transaction history corresponding to the completion of the second payment request may be transmitted for the user to utilize while travelling on the transportation vehicle. The second payment request may be processed based on a user request for the additional transportation fare, or may be automatically processed without user input, for example, if the user forgets to add additional fare or the user device loses power/signal.

Figure 5:
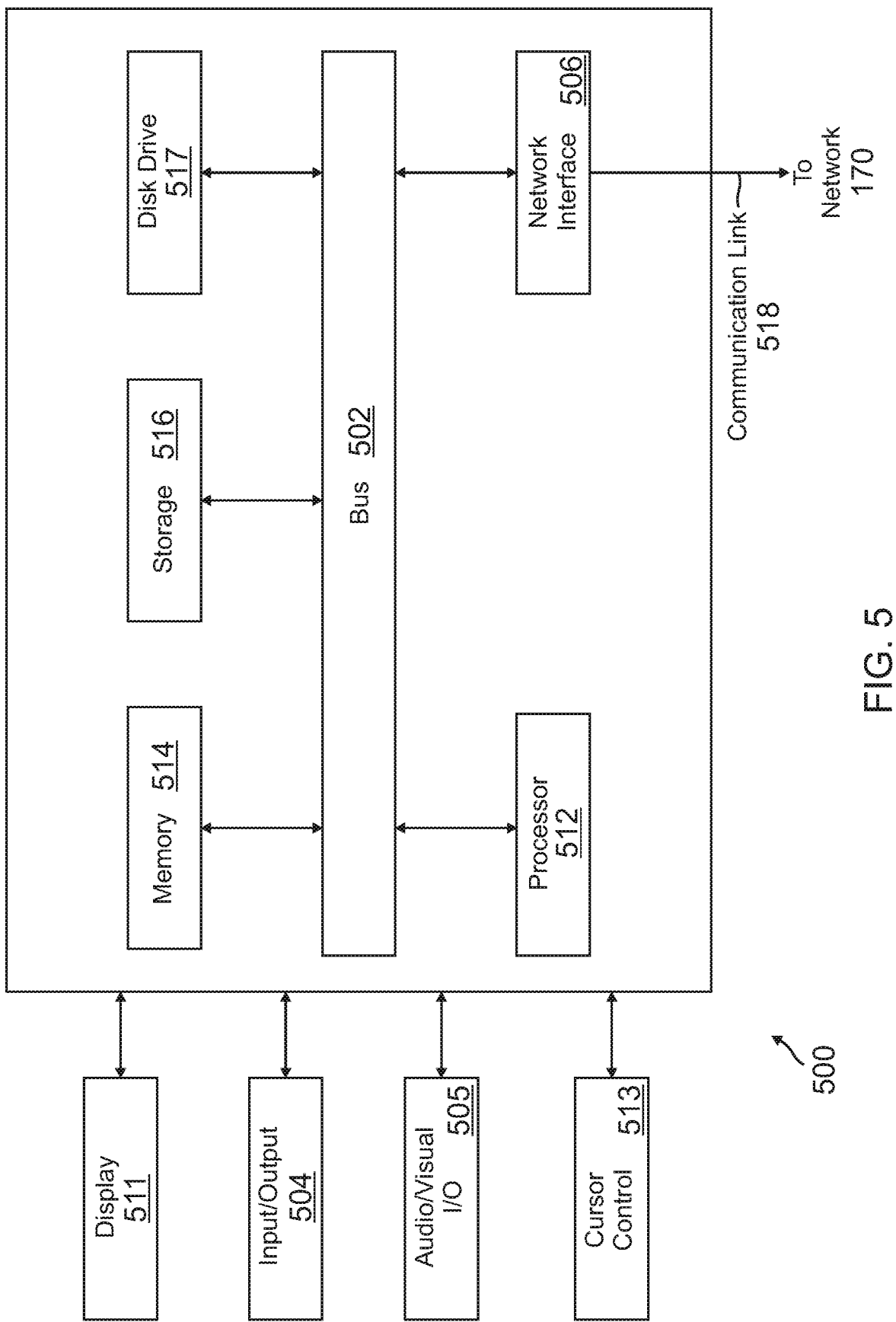
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
one or more hardware processors configured to execute the instructions to cause the system to:
 access first check-in information for a user device for a user, the first check-in information indicating a user account associated with the user device, the first check-in information further indicating one or more routes available from a provider location that initiated a first check-in for the first check-in information;
 process a first payment request for a transportation fare for a transportation provider operable to transport the user along a route from a first zone in a first geographical area to a second zone in a second geographical area based on the transportation fare;
 generate an admission code for an admission to the transportation provider via a turnstile at the first zone;
 provide a transaction history to the user device and the turnstile for admission to the transportation provider at the first zone, wherein the transaction history comprises the admission code;
 detect, via a first short range wireless signal broadcast by a first beacon associated with the first zone, that the user is within a proximity of the first zone, wherein the first beacon comprises a portion of the turnstile at the first zone;

cause the turnstile to admit the user to the transportation provider at the first zone based on the admission code;
cause the user device to passively monitor for a second short range wireless signal broadcast by a second beacon;
detect a connection between the user device and the second beacon of the transportation provider via the second short range wireless signal broadcast by the second beacon, wherein the second short range wireless signal comprises a wake-up process for the user device that causes the user device to establish the connection, and wherein the connection is established in response to the user device and the second beacon ramping up in power based on the wake-up process;
generate, based on the connection, second check-in information to complete a second check-in of the user device with the transportation provider when the user boards the transportation provider;
prior to the transportation provider entering a third zone in a third geographical area of the route, determine that the user will enter the third zone after the transportation provider has entered the second zone;
in response to determining that the user will enter the third zone, determine that the transportation fare does not cover a cost of travel in the third zone;
prior to the transportation provider entering the third zone, process a second payment request for an additional transportation fare for the third zone without requiring a user input from the user confirming the second payment request, wherein the second payment request is processed after processing the first payment request;
generate a displayable code for the additional transportation fare, wherein the displayable code verifies the additional transportation fare with a device on the transportation provider; and
provide the displayable code to the user device.

2. The system of claim 1, wherein the connection between the user device and the second beacon uses one of near field communication, radio communication, infrared communication, Bluetooth communication, or Bluetooth low energy communication.

3. The system of claim 1, wherein the transaction history is transmitted to at least one of a transportation provider server or a payment device corresponding to the transportation provider, and wherein the payment device provides a token for the admission to the transportation provider.

4. The system of claim 1, wherein the turnstile corresponds to an entry at a location corresponding to the transportation provider.

5. The system of claim 1, wherein the transportation fare comprises one of a flat fare, a time-based fare, a zone-based fare, or a distance-based fare.

6. The system of claim 1, wherein the second beacon is located on the transportation provider.

7. The system of claim 1, wherein an authority on the transportation provider receives the transaction history.

8. The system of claim 1, wherein the user device receives the transaction history, and wherein the admission code comprises a proof of payment using a barcode or a QR code.

9. The system of claim 1, wherein the one or more hardware processors is further configured to:
alert the user through the user device if the transportation fare does not cover a cost of use of the transportation provider.

10. The system of claim 1, wherein executing the instructions further causes the system to:
process the second payment request for the additional transportation fare with the transportation provider while the user device is on the transportation provider; wherein the transaction history further corresponds to the second payment request.

11. The system of claim 10, wherein the second payment request is automatically processed without the user input using the user account of the user used for the first check-in.

12. The system of claim 1, wherein the transportation provider provides at least one of transportation vehicle scheduling for a transportation vehicle of the transportation provider, passenger congestion rates at or on specific cars or areas of the transportation vehicle, weather at stops of the transportation vehicle, or timing updates of the transportation vehicle to the user device.

13. A method comprising:
accessing first check-in information for a user device of a user, the first check-in information indicating a user account associated with the user device, the first check-in information further indicating one or more routes available from a provider location that initiated a first check-in for the first check-in information;
processing a first payment request for a transportation fare for a transportation provider operable to transport the user along a route from a first zone in a first geographical area to a second zone in a second geographical area based on the transportation fare;
generating an admission code for an admission to the transportation provider via a turnstile at the first zone;
providing a transaction history to the user device and the turnstile for admission to the transportation provider at the first zone, wherein the transaction history comprises the admission code;
detecting, via a first short range wireless signal broadcast by a first beacon associated with the first zone, that the user is within a proximity of the first zone, wherein the first beacon comprises a portion of the turnstile at the first zone;
causing the turnstile to admit the user to the transportation provider at the first zone based on the admission code;
causing the user device to passively monitor for a second short range wireless signal broadcast by a second beacon;
detecting a connection between the user device and the second beacon that is located on the transportation provider via the second short range wireless signal broadcast by the second beacon, wherein the second short range wireless signal comprises a wake-up process for the user device that causes the user device to establish the connection, and wherein the connection is established in response to the user device and the second beacon ramping up in power based on the wake-up process;
generating, based on the connection, second check-in information to complete a second check-in of the user device with the transportation provider when the user boards the transportation provider;
prior to the transportation provider entering a third zone in a third geographical area of the route, determining that the user will enter the third zone after the transportation provider has entered the second zone;
in response to determining that the user will enter the third zone, determining that the transportation fare does not cover a cost of travel in the third zone;

prior to the transportation provider entering the third zone, processing a second payment request for a second transportation fare for the third zone without requiring a user input from the user confirming the second payment request, wherein the second payment request is processed after processing the first payment request;

generating a displayable code for the second transportation fare, wherein the displayable code verifies the second transportation fare with a transportation provider device on the transportation provider; and providing the displayable code to the user device.

14. The method of claim 13, wherein the first check-in comprises receiving the first payment request indicating the first transportation fare with for the transportation provider that provides transportation of the user device along the route from the first zone in the first geographical area to the second zone in the second geographical area, wherein the first check-in is different from the second check-in.

15. The method of claim 13, wherein the transaction history is transmitted to at least one of a transportation provider server or a payment device corresponding to the transportation provider, and wherein the payment device provides a token for the admission to the transportation provider.

16. The method of claim 15, wherein at least one of an authority on the transportation provider and the user device receives the transaction history, and wherein the transaction history comprises proof of payment.

17. The method of claim 13, wherein the second check-in information is generated between the user device and the second beacon at a first location, and wherein the turnstile corresponds to an entry at a location corresponding to the transportation provider.

18. The method of claim 13 further comprising:
alerting the user through the user device if the transportation fare does not cover a cost of use of the transportation provider; and
processing the second payment request for the second transportation fare with the transportation provider while the user device is on the transportation provider;
wherein the transaction history further corresponds to the second payment request.

19. The method of claim 13, wherein the transportation provider provides at least one of transportation vehicle scheduling for a transportation vehicle of the transportation provider, passenger congestion rates at or on specific cars or areas of the transportation vehicle, weather at stops of the transportation vehicle, or timing updates of the transportation vehicle to the user device.

20. A non-transitory computer readable medium having instructions stored thereon, the instructions executable to cause performance of operations comprising:
receiving a first payment request from a user device of a user wherein the first payment request comprises at least a transportation fare with a transportation provider, the transportation provider operable to transport the user along a route from a first zone in a first geographical area to a second zone in a second geographical area;
processing the first payment request for the transportation fare;
generating an admission code for an admission to the transportation provider via a turnstile at the first zone;
providing a transaction history to the user device and the turnstile for admission to the transportation provider at the first zone based on the first payment request, wherein the transaction history comprises the admission code;
detecting, via a first short range wireless signal broadcast by a first beacon associated with the first zone, that the user is within a proximity of the first zone, wherein the first beacon comprises a portion of the turnstile at the first zone;
causing the turnstile to admit the user to the transportation provider at the first zone based on the admission code;
causing the user device to passively monitor for a second short range wireless signal broadcast by a second beacon;
detecting a connection between the user device and the second beacon that is located on the transportation provider via the second short range wireless signal broadcast by the second beacon, wherein the second short range wireless signal comprises a wake-up process for the user device that causes the user device to establish the connection, and wherein the connection is established in response to the user device and the second beacon ramping up in power based on the wake-up process;
prior to the transportation provider entering a third zone in a third geographical area of the route, determining that the user will enter the third zone after the transportation provider has entered the second zone;
in response to determining that the user will enter the third zone, determining that the transportation fare does not cover a cost of travel in the third zone;
prior to the transportation provider entering the third zone, processing a second payment request for an additional transportation fare for the third zone without requiring a user input from the user confirming the second payment request, wherein the second payment request is processed after processing the first payment request;
generating a displayable code for the additional transportation fare, wherein the displayable code verifies the additional transportation fare with a transportation provider device on the transportation provider; and
providing the displayable code to the user device.

* * * * *